E. B. COBURN.
ICE CUTTING MACHINE.
APPLICATION FILED MAR. 15, 1918.

1,306,047.

Patented June 10, 1919.

Inventor
Edward B. Coburn.
By Attorneys
Fowler & Kennedy

UNITED STATES PATENT OFFICE.

EDWARD B. COBURN, OF WORCESTER, MASSACHUSETTS, ASSIGNOR OF ONE-HALF TO JOHN B. HANNIGAN, OF WORCESTER, MASSACHUSETTS.

ICE-CUTTING MACHINE.

1,306,047.   Specification of Letters Patent.   Patented June 10, 1919.

Application filed March 15, 1918. Serial No. 222,603.

*To all whom it may concern:*

Be it known that I, EDWARD B. COBURN, a citizen of the United States, residing at Worcester, in the county of Worcester and Commonwealth of Massachusetts, have invented a new and useful Improvement in Ice-Cutting Machines, of which the following, taken in connection with the accompanying drawings, is a specification.

My ice cutting machine is especially designed to assist in the removal of ice from the surface of streets or between the tracks of electric railways, and it comprises mechanism illustrated in the accompanying drawings, in which—

Similar reference characters refer to similar parts in the different views.

Figure 1:
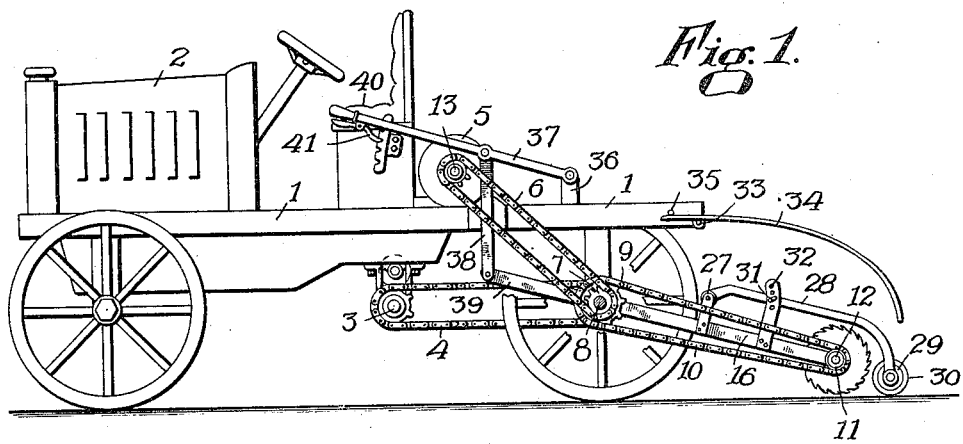
Figure 1 represents a side elevation of my improved machine.

Referring to Fig. 1 of the drawings, 1 denotes a platform vehicle which may be drawn or, as in the present instance, propelled by its own power. As represented in Fig. 1 the vehicle 1 is propelled by an internal combustion engine mounted beneath the hood 2, through a jack shaft 3 and a chain drive 4 in the usual manner of propelling trucks. In Fig. 1 one of the rear wheels, nearest the observer, has been removed, to show more clearly the mechanism for propelling the cutting saws, and the farthermost rear wheel is partly broken away for the same purpose.

Mounted upon the vehicle 1 is a motor 5 connected by a chain belt 6 with sprocket wheels 7 mounted loosely upon an axle 8, about which the rear wheels of the vehicle are journaled. Attached to the sprocket wheel 7 is a sprocket wheel 9 connected by a chain belt 10 with a sprocket wheel 11, on a saw shaft 12. The shaft 13 of the motor 5 is preferably extended across the vehicle and the driving connection between the motor shaft 13 and the saw shaft 12 is duplicated upon the opposite side of the machine, said saw shaft carrying two sprocket wheels 11 and 14, the latter being provided with a chain belt 15, Fig. 2. Swinging upon the axle 8 is a frame comprising the two side bars 16 and 17 in the free ends of which is journaled the saw shaft 12.

The saw shaft 12 is a square shaft turned down at its opposite ends to form bearings for the swinging bars 16 and 17. Between the bars 16 and 17, upon the squared section of the shaft 12 are loosely mounted a multiplicity of saws 18. The two end saws 19 and 20, nearest the swinging bars 16 and 17 are attached by screws 21 to collars 22 which are attached to the shaft 12 by pins 23. The remaining intermediate saws 18 have square holes and are slipped loosely upon the square shaft 12. Upon each side of the saws 18 are placed yielding flexible collars 24, and between the collars 24 are iron spacing collars 25, having their opposite surfaces, which bear against the collars 24, slightly rounded, as shown at 26, so that the saws, when in action, are permitted to wabble slightly on the square shaft 12.

Figure 2:
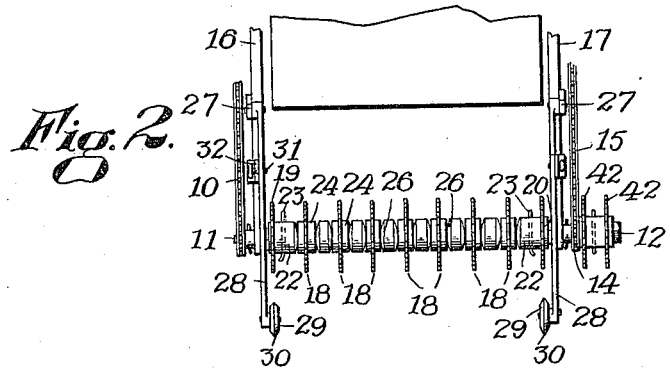
Fig. 2 is a plan view of a revolving shaft carrying a multiplicity of loosely mounted saws, for the purpose of cutting the ice upon the surface of a street into narrow strips.

Mounted upon the swinging bars 16 and 17 are brackets 27, 27, to which are pivoted bars 28, 28, in the free ends of which, turning freely upon studs are gage rollers 29 having their peripheries beveled or chisel shaped, as shown at 30, 30, Fig. 2. The gage rollers 29 are in alinement with the end saws 19 and 20. The bars 28 are adjustably held at any desired elevation to allow the saws to clear the ground by means of pins 31 held in holes in a bracket 32. Pivoted at 33 to the rear end of the vehicle is a sheet metal hood 34 which is prevented from falling by a pin 35, but is free to be lifted when the saws are raised. Pivoted upon posts 36 are levers 37, one upon each side of the machine, which are connected by links 38 with rearward extensions 39 of the swinging bars 16 and 17. The levers 37 extend forwardly upon each side of the driver's seat 40 and are each provided with a locking arrangement 41. By depressing the levers 37 the bars 16 and 17 pivoted upon the axle 8 will be swung to raise the saw shaft 12 sufficiently to elevate the saws in going to or from the work.

Figure 3:
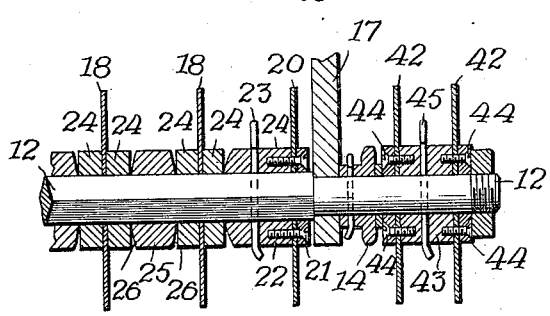
Fig. 3 is a plan view of a portion of the saw shaft upon a larger scale, showing the method of mounting the saws thereon with their spacing collars, the saws and collars being shown in central sectional view.
Figure 4:
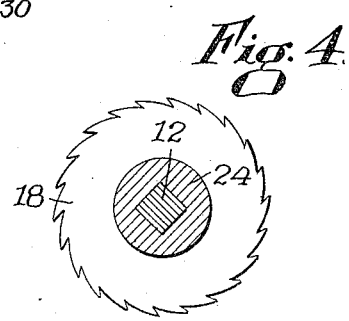
Fig. 4 is a side elevation of one of the saws.

The apparatus as above described, when provided with flanged supporting wheels, is capable of running upon the track of an electric railway, for the purpose of cutting the ice between the tracks. In order to cut the ice upon the surface of a street next the curbstone, I extend the shaft 12 to the right of the swinging bar 17, Fig. 3, and attach to the extended end of the shaft two additional saws 42, 42, each saw being attached to an iron collar 43 by means of screws 44, and the collar 43 is attached to the shaft 12 by a pin 45.

I claim,

1. In a machine of the class described, a vehicle, a swinging frame supported at one end by the vehicle, a saw shaft journaled in the free end of said frame, a multiplicity of saws mounted on said shaft, bars pivotally mounted on said swinging frame, means for adjusting the height of said bars, and a pair of gage rolls supported by said bars having beveled edges and mounted at the rear of and in alinement with two of said saws.

2. In a machine of the class described, a vehicle, a swinging frame supported at one end by the vehicle, a saw shaft journaled in the free end of said frame, a multiplicity of saws mounted on said shaft, bars pivotally mounted on said swinging frame, means for adjusting the height of said bars, and a pair of gage rolls supported by the free ends of said bars.

3. In a machine of the class described, a vehicle, a swinging frame pivotally supported on the vehicle, a square shaft journaled in said frame, a multiplicity of saws loosely mounted on said shaft, spacing means between said saws comprising rigid collars having rounded ends, whereby said saws are capable of a slight wabbling motion on said shaft, and means for rotating said shaft.

4. In a machine of the class described, a vehicle, a swinging frame pivotally supported on the vehicle, a shaft journaled in said frame, a multiplicity of saws mounted on said shaft, spacing means between said saws, comprising rigid collars having rounded ends, whereby said saws are capable of a slight wabbling motion on said shaft, means for rotating said shaft, and means for imparting the rotative movement of the shaft to the saws.

5. In a machine of the class described, a vehicle, a swinging frame pivotally supported on the vehicle, a shaft journaled in said frame, a series of saws mounted on said shaft, with the outermost saws at each end of said series attached to the shaft and with the intermediate saws loose on the shaft and spaced by rigid collars having rounded ends to permit a slight wabbling motion to said intermediate saws, means for rotating said shaft, and means for imparting the rotative movement of the shaft to said saws.

6. In a machine of the class described, a vehicle, a swinging frame pivotally mounted thereon, a saw shaft journaled in said frame, a multiplicity of saws loosely mounted thereon, means for imparting the rotary motion of the shaft to said saws, and means for spacing said saws apart, comprising a compressible washer on each side of said saws, and a rigid collar interposed between said washers, said collars having their ends slightly rounded to permit a slight wabbling movement to said saws, and means for holding said saws from longitudinal movement on said shaft.

Dated this 11th day of March, 1918.

EDWARD B. COBURN.

Witnesses:
NELLIE WHALEN,
PENELOPE COMBERBACH.

Copies of this patent may be obtained for five cents each, by addressing the "Commissioner of Patents, Washington, D. C."